Nov. 3, 1959                     L. BIHALY                          2,910,934
                         APPARATUS FOR RECORDING DATA
Filed Aug. 19, 1952                                              12 Sheets-Sheet 1

Inventor
Lajos Bihaly
By Dezso Steinberg
Attorney

Inventor
Lajos Bihaly

By Dezsoe Steinberg
Attorney

Nov. 3, 1959

L. BIHALY 2,910,934

APPARATUS FOR RECORDING DATA

Filed Aug. 19, 1952

Inventor
Lajos Bihaly
By Dezsoe Steinberg
Attorney

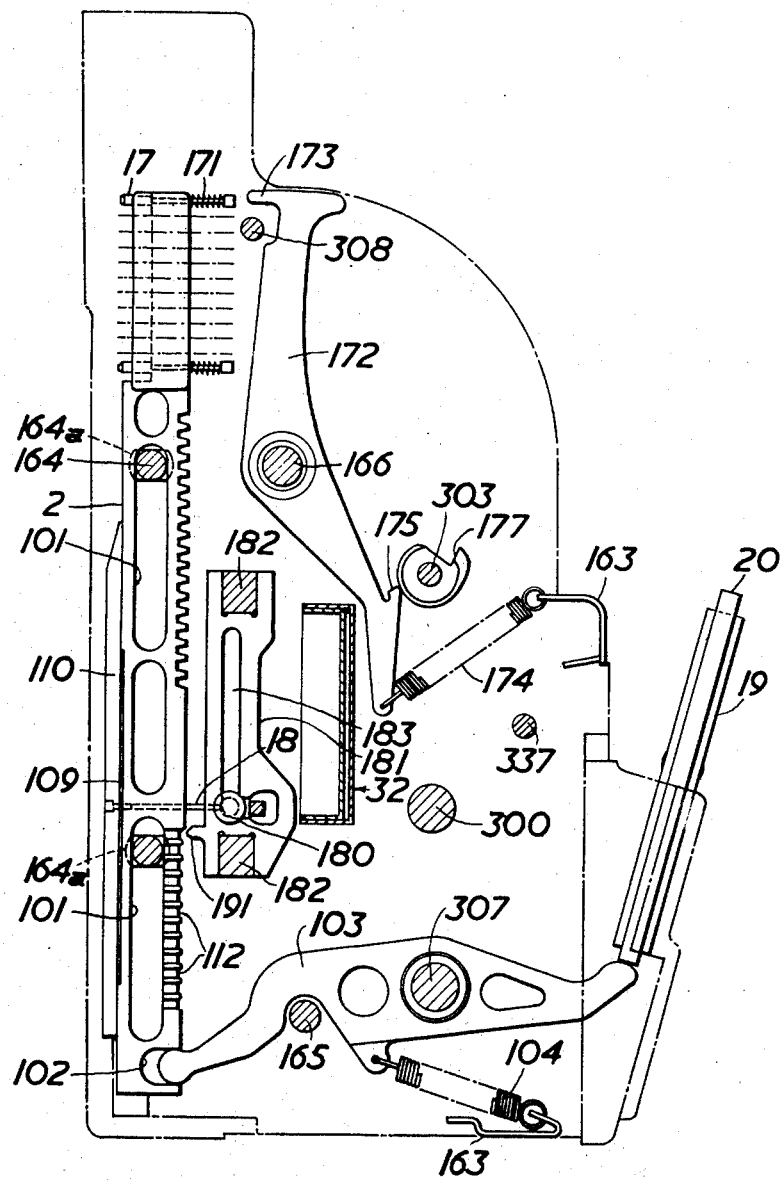

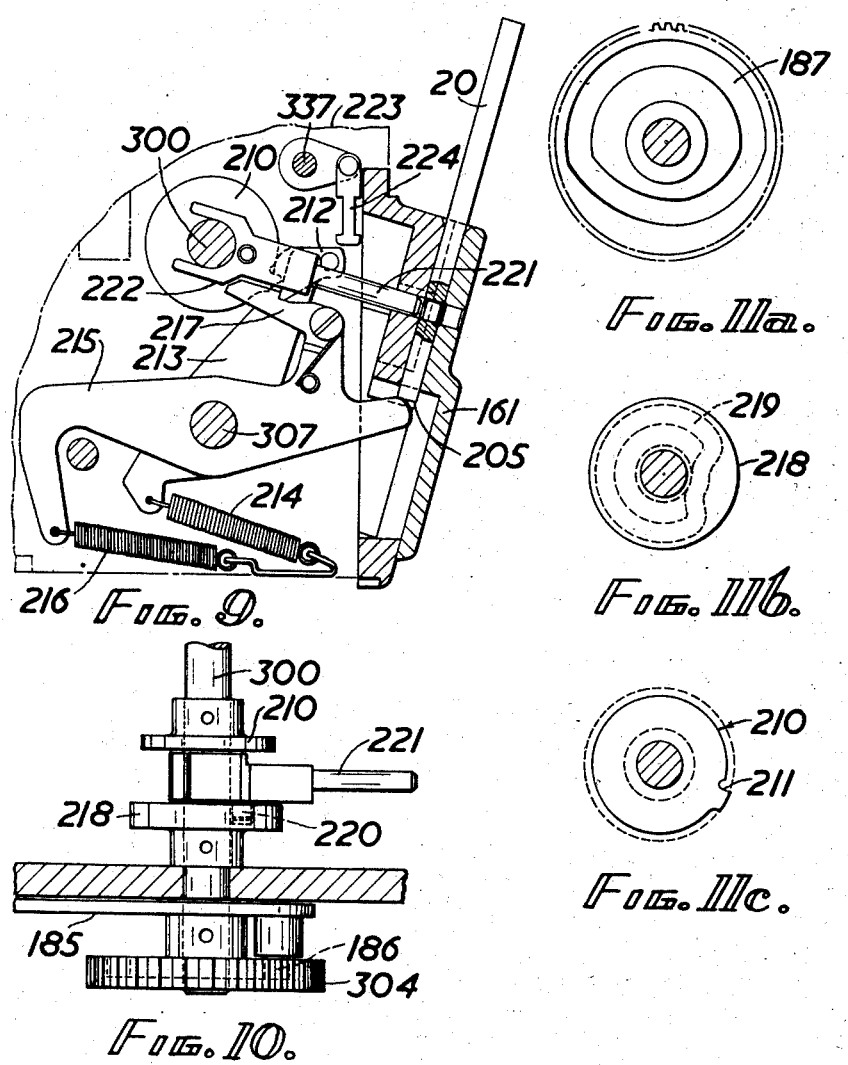

Nov. 3, 1959  L. BIHALY  2,910,934
APPARATUS FOR RECORDING DATA
Filed Aug. 19, 1952  12 Sheets-Sheet 9

Inventor
Lajos Bihaly
By Dzsoe Steinberg
Attorney

Nov. 3, 1959 L. BIHALY 2,910,934
APPARATUS FOR RECORDING DATA
Filed Aug. 19, 1952 12 Sheets-Sheet 10

Inventor
Lajos Bihaly
By Dezsoe Steinberg
Attorney

Nov. 3, 1959      L. BIHALY      2,910,934
APPARATUS FOR RECORDING DATA
Filed Aug. 19, 1952      12 Sheets-Sheet 12
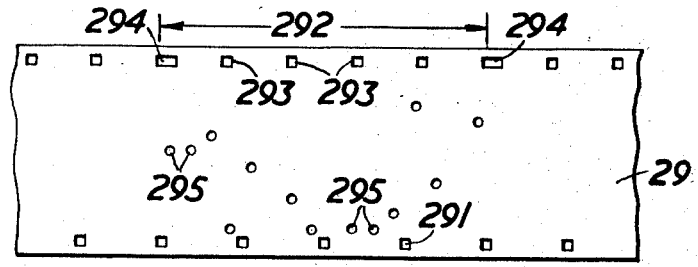
Fig. 19.
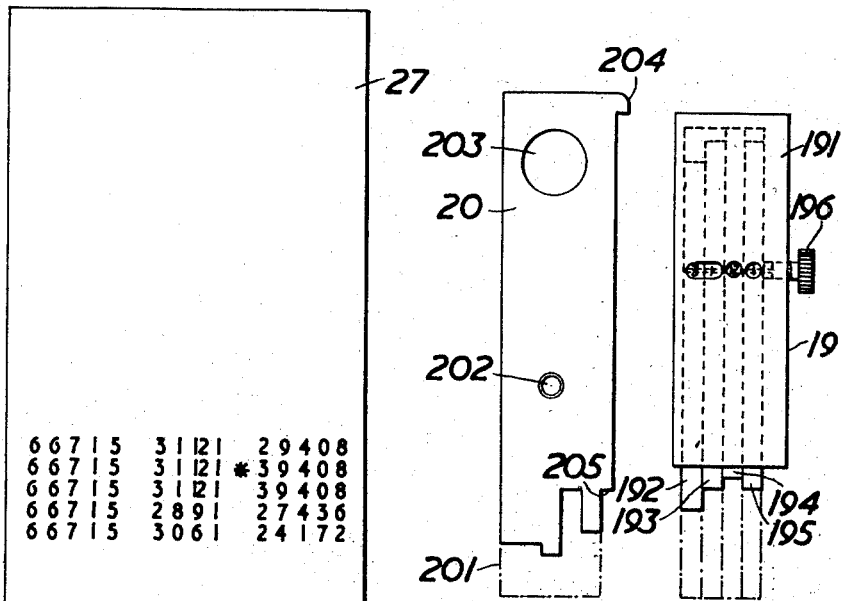
Fig. 21.    Fig. 22.
Fig. 20.
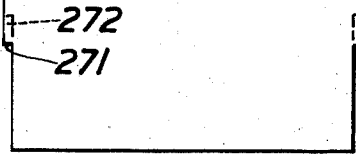
Inventor
Lajos Bihaly
By Dezső Steinberg
Attorney

United States Patent Office 2,910,934
Patented Nov. 3, 1959

2,910,934

APPARATUS FOR RECORDING DATA

Lajos Bihaly, London, England, assignor to Industrial Accountancy Partnership Limited, London, England, a British company Application August 19, 1952, Serial No. 305,258

23 Claims. (Cl. 101—19)

The use of accounting and other machines controlled by cards on which data has been recorded in the form of punched holes involves the preparation of very large numbers of such punched cards. The cards are usually punched in an apparatus which is manually controlled by an operator who reads the data from previously prepared written or printed vouchers. As many as one hundred such operators may be needed to prepare and verify the punched cards which can be handled by a single machine.

The necessity for employing a large staff of operators to translate written or printed data into card punchings can be avoided by the use of apparatus which is already known. The card punching apparatus is controlled automatically by a band or tape of paper on which the data has already been recorded in the form of punched holes, a single length of tape carrying the data for a large number of cards. The punching of the tape is effected in a data recording apparatus in which the manual operations necessary to print data upon a voucher also result in the punching of corresponding holes in the tape. However, the known data recording apparatus of this character are relatively complicated and expensive machines and are therefore only suitable for use in cases where large amounts of data are first recorded at each of a relatively small number of positions.

The present invention provides simple and self-contained data recording apparatus which operates to print data upon a voucher and to punch corresponding holes in a paper tape that can later be used to control automatically the punching of the required record cards.

In accordance with the invention apparatus for recording data comprises means for effecting the step by step feed of a paper tape in a direction longitudinal of the tape, a plurality of members disposed side by side and each differentially adjustable across the width of the tape to a plurality of positions, a paper punch carried by each of said members, a set of type elements operatively associated with each of said members so that adjustment of the member to any one of said positions is effective to locate a particular one of said elements in a printing position, and operating means effective after adjustment of said members to cause the punches to perforate the paper tape at positions dependent upon the adjustment of said members and to effect printing from that type element of each set which has been brought to the printing position by the adjustment of the members.

The invention also includes a paper record tape adapted for use in data recording apparatus constructed in accordance with the invention. For the rest, the nature of the invention will sufficiently appear from the appended claims when read in the light of the following description of the particular form of apparatus constructed in accordance with the invention which is illustrated in the accompanying drawings.

The apparatus illustrated is intended primarily for use in recording the readings of gas or electricity meters, the punched cards which are later produced from the recorded data being used in the preparation of customers accounts. The construction and operation of the apparatus illustrated will be described by reference to this particular use of the apparatus, but it will be understood that this invention is not limited to apparatus used, or adapted for use, for this particular purpose.

In the drawings:

Figure 8 is a section, similar to that of Figure 7, taken on the line VIII—VIII of Figure 4 and showing one of the adjustable members which are adjusted in groups by the insertion of a key;

Figure 9 is a fractional section, taken in a plane parallel to those of Figures 7 and 8, showing the interlock means associated with the meter key;

Figure 10 is a fractional plan view, showing a detail of the mechanism;

Figures 11a, 11b and 11c are end elevations showing separately three of the members shown in Figure 10;

Figure 19 shows a short length of the paper tape employed in the apparatus;

Figure 20 shows a meter record card, as printed by the apparatus;

Figure 21 shows a meter number setting key, or meter key; and

Figure 22 shows a date setting key.

Figure 1:
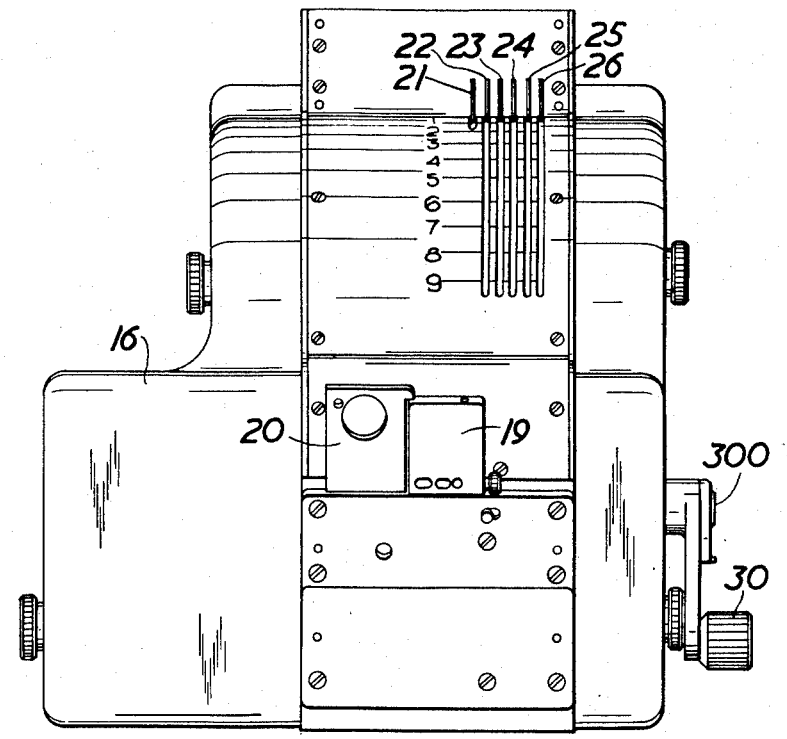
Figure 1 is a front elevation and Figure 2 a plan of the complete apparatus with data and meter keys inserted.
Figure 2:
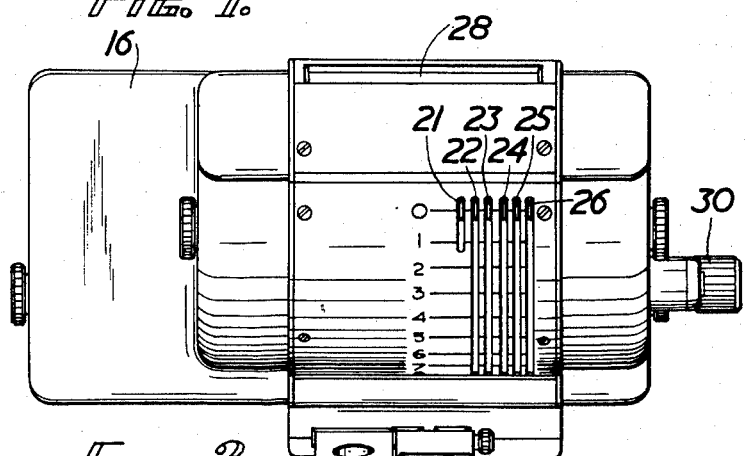
Figure 3:
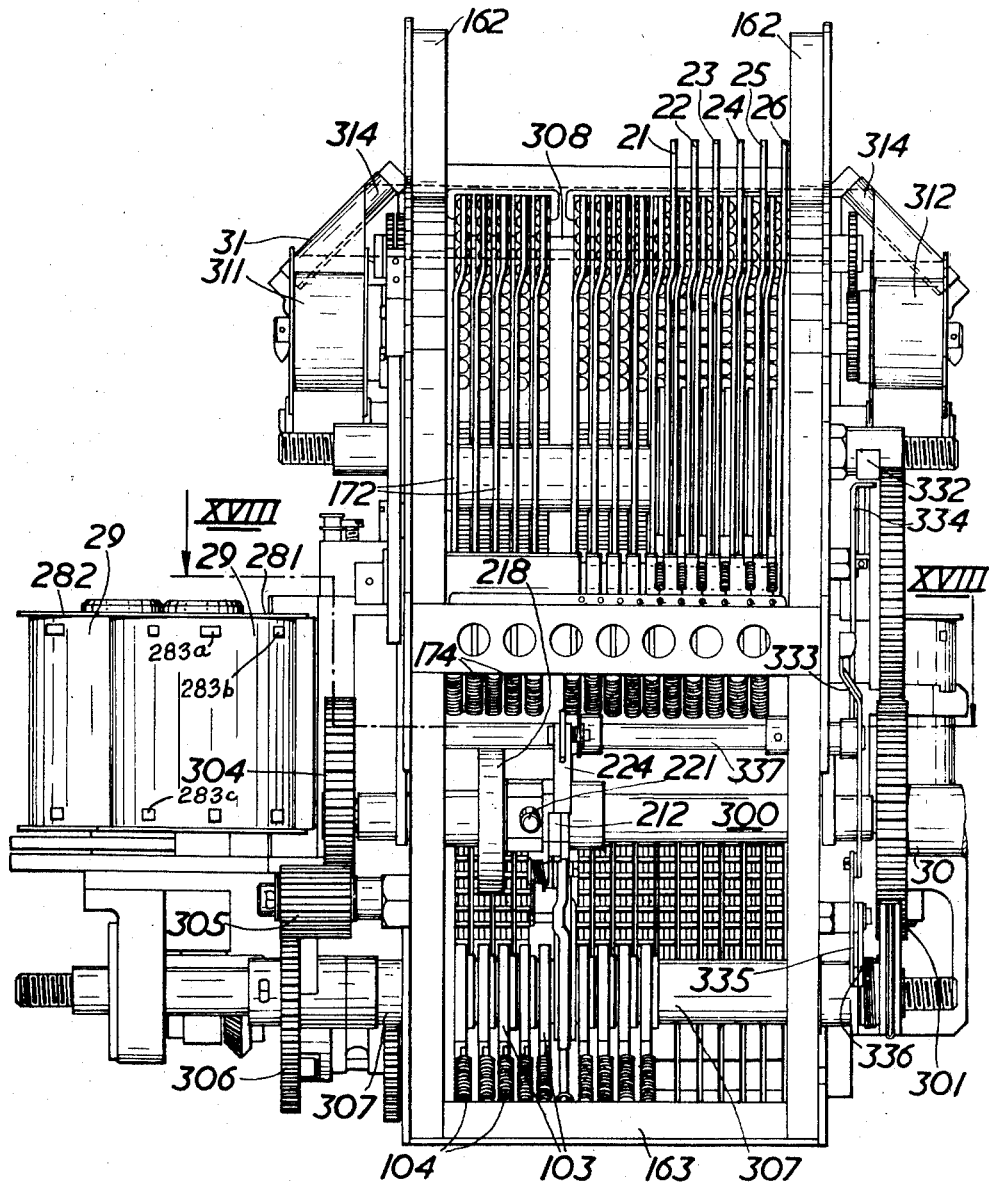
Figure 3 is a front elevation and Figure 4 a plan of the interior mechanism of the apparatus, the outer casing being removed.
Figure 4:
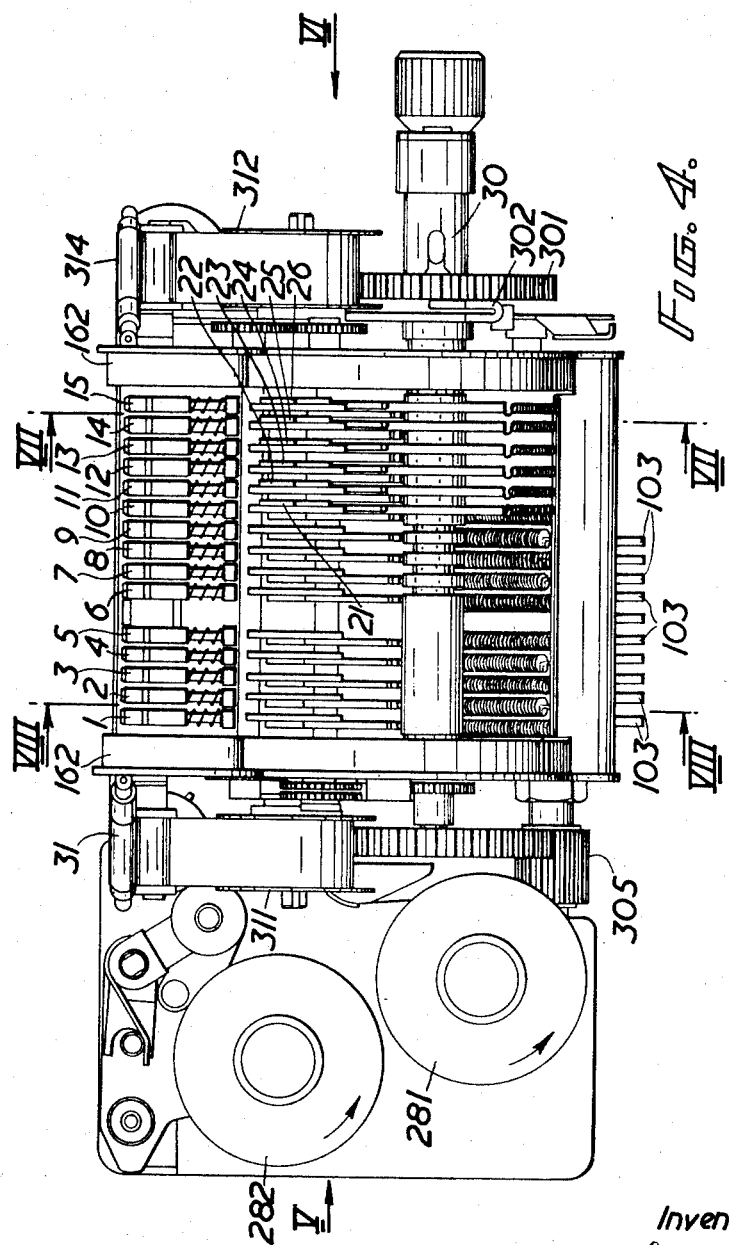

The general arrangement and mode of operation of the apparatus are very briefly as follows (see particularly Figures 1 to 4 and 19 to 22).

The overall measurements of the apparatus are approximately 7½ inches in width, 4 inches in depth and 8¾ inches in height. The apparatus may conveniently be supported on a strap (not shown) slung round the neck of the operator. It comprises a removable casing or housing composed of a number of separate parts and designated generally by the numeral 16.

The internal mechanism comprises fifteen vertically disposed type bars (1 to 15) set side by side which can be adjusted vertically independently of one another. The type bars are disposed at 4 mm. centres except that bars 5 and 6 are 8 mm. apart. The upper part of each type bar carries up to twelve type elements 17 spaced vertically apart at 3 mm. centres, and the lower part of each type bar carries a single paper punch 18.

Four of the type bars (6 to 9) serve to record the date on which the reading is made and these bars are adjusted to the appropriate positions by the insertion of an adjustable date setting key 19 through an aperture in a forwardly projecting portion 161 at the base of the casing 16. This date key 19 remains semi-permanently in position, being withdrawn from the apparatus only once daily for adjustment to the current date.

Five other type bars (1 to 5) serve to record the number of the meter to which the reading relates and these bars also are positioned by inserting a key 20 into the forwardly projecting portion of the casing. Such a meter key 20 is provided for each individual meter and may conveniently be chained or otherwise attached to the meter itself.

The remaining six type bars (10 to 15) are individually positioned by means of as many manually operable levers (21–26) which project from this upper part of the front of the casing and move in vertical planes. Five of these type bars (11 to 15) serve to record the meter reading and each of them carries ten type elements representing the digits 0 to 9. The remaining type bar 10 has only two effective positions (in only one of which it is effective to print a character or punch a hole) and serves to indicate whether the data being recorded represents a normal entry or a "reverse" entry, intended to cancel an incorrect entry already made.

A slot 28 at the rear of the upper face of the casing allows the insertion of the lower end of a meter record card 27 (Figure 20) which is disposed vertically behind the upper parts of the type bars. A length of paper tape 29, extending through the mechanism from a storage reel 281 to a take-up reel 282, has a part of its length disposed behind the punches 18 carried by the lower parts of type bars.

When the type bars have been positioned and the meter record card inserted, the apparatus is operated by making one revolution of a crank handle 30 which projects from one side of the casing. During approximately the first half of the rotation, those type elements which have been brought to a particular horizontal level by the vertical adjustment of the type bars are forced rearwardly. These type elements strike through an inked ribbon 31 onto the meter record card and print the appropriate data. During this part of the rotation also, the punches 18 carried by the type bars are forced rearwardly to perforate the paper tape at positions (measured from the longitudinal edges of the tape) dependent upon the setting of the type bars and consequently indicative of the data printed upon the card. An additional paper cutting device operated with the paper punches severs portions of the meter record card, so that when the latter is next inserted into a recording apparatus it will penetrate to a greater depth and the data will be printed at a higher level on the card than on the previous occasion. During the second half of the rotation of the crank handle, the paper tape 29 is wound on from the supply reel to the take-up reel to bring a fresh length into position for punching and the inked ribbon 31 is advanced through a small distance.

The moving parts of the mechanism are supported by a stationary frame which comprises two main chassis plates 162 set in vertical planes and extending from front to rear of the apparatus, these plates being held in spaced parallel relation by a number of longitudinal members 163. Journalled in the main chassis plates 162 is a shaft 300, to whose extreme right hand end the crank handle 30 is secured. Fast to shaft 300 outside the right hand chassis plate 162 is a gear wheel 301 which meshes with an equal gear wheel 302 on a parallel shaft 303, also journalled in plate 162. At its left hand end shaft 300 carries a further equal gear 304, which through the intermediary of pinion 305 drives a fourth equal gear 306 rotatably supported on a fixed shaft 307, extending parallel to shafts 300 and 303. Rotation of the crank handle 30 thus causes rotation at equal speeds of shafts 300 and 303 and of gear 306. Also journalled in the chassis plates 162 is a further parallel shaft 308 which forms part of the mechanism provided for advancing the inked printing ribbon.

Figure 7:
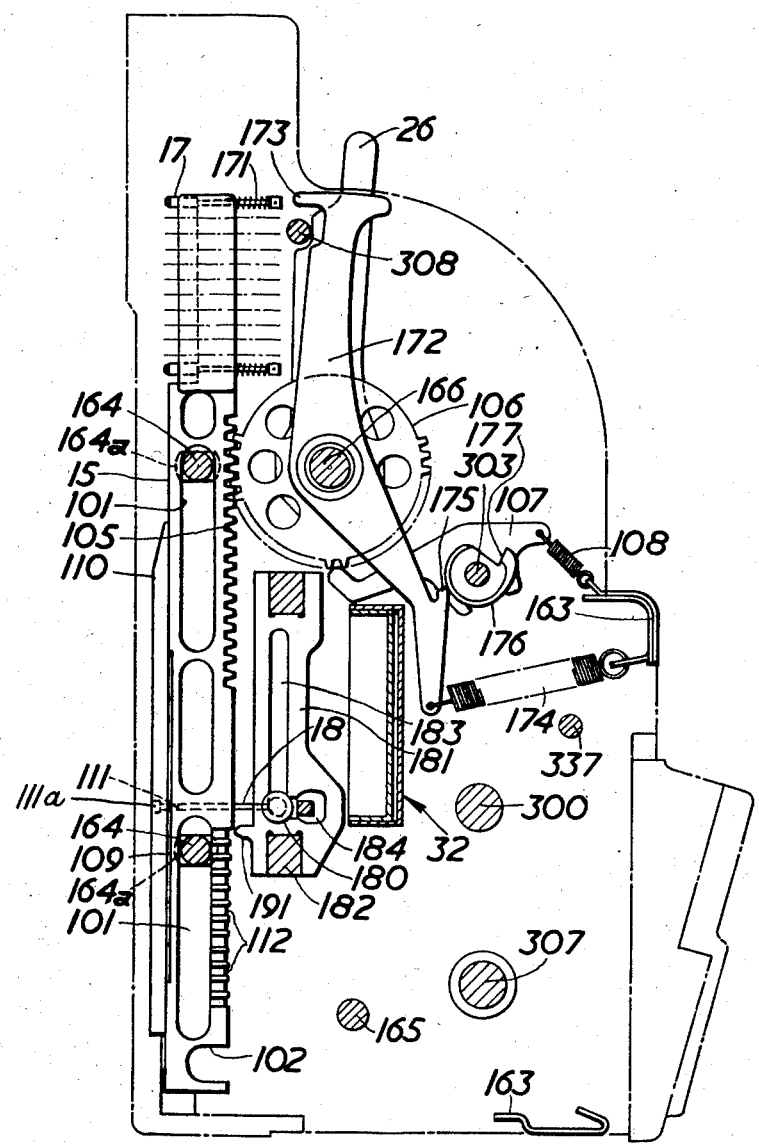
Figure 7 is a transverse vertical section through the mechanism taken on the line VII—VII of Figure 4, and showing one of the adjustable members which are provided with individual manually operated setting means.

The type bars 1 to 15 lie parallel to the chassis plates 162 and are disposed side by side between the rear parts of those plates. As is best shown by Figures 7 and 8, the type bars are guided for vertical movement by rods 164 which extend between the plates 162 and pass through elongated slots 101 in the type bars, the rods 164 being formed between the type bars with enlargements 164a which prevent lateral movements of the type bars.

Each of the type bars is formed near the lower end of its front edge with a recess 102. The recess 102 of each of the nine bars 1 to 9 which are set by the insertion of keys receives the rear end of a lever 103, (see Figure 8), the levers 103 being all pivotally supported upon fixed shaft 307 but being movable independently of that shaft and of one another. The keys 19 and 20, described in greater detail below, include for each lever 103 a portion of appropriate length which projects downwards into the casing to engage and depress the front end of the appropriate lever, thereby raising the corresponding type bar through a distance equal to about one and a half times the travel of the front end of the lever. Tension springs 104 anchored to one of the members 163 acting on the levers 103 tend to return the type bars to their lowest positions.

Each of the type bars is also formed on its front edge with rack teeth 105. The teeth 105 of each of the six type bars 10 to 15 mesh with teeth formed on the periphery of one of a set of six discs 106 (see Figure 7) which are supported for independent rotation upon a spindle 166 extending between the main chassis plates 162. The six discs 106 are secured respectively to the setting arms 21 to 26, which project through slots in the casing 16 of the apparatus. The teeth of each disc 106 are also engaged by the rounded tip of a lever 107, which is supported by shaft 303 for rotation independently of the shaft, a spring 108 anchored to one of the chassis members 163 holding the tip of the lever against the disc. This spring mounted lever 107 imparts a step-by-step character to the movement of the corresponding setting lever and guards against its being left in an intermediate position.

The type elements 17 are mounted in apertures which extend from front to rear through the upper parts of the type bars, each type element being urged forwardly relative to its type bar by a helical compression spring 171. For each type bar there is provided a hammer lever 172 which is rotatably supported upon spindle 166 and has its upper end formed as a hammer 173. Each hammer is urged rearwardly by a spring 174, anchored to one of the members 163 and acting on the lower end of lever 172, and is driven forwardly by the engagement with a projection 175 on lever 172 of a cam 176. All the cams 176 are secured on the shaft 303. Steps 177 in the cams allow the hammers to move freely rearwardly under the influence of springs 174 and strike the front ends of those type elements which have been brought to the level of the hammers. These type elements are thereby thrown rearwardly, against the action of their own springs 171, to effect printing. The hammers are arrested by engagement with the shaft 308 after they have struck the type elements but before the latter strike the printing surface. The type elements are consequently free to return forwardly under the influence of their own springs after effecting printing.

The lower part of each type bar is formed with a narrow vertical slot 109 constituted by a bridge piece 110, co-planar with the main body of the type bar and secured to its rear edge. The paper tape 29 passes through the tunnel constituted by the aligned slots 109 in the type bars and slots 167 (see Figure 13) in the chassis plates 162, the slots 109 being of sufficient length to permit the type bars to move over their whole range of adjustment without engaging the upper or lower edge of the tape. Each type bar is formed with a cylindrical bore 111 extending from front to rear of the bar and passing across the slot 109. The punch 18 is accommodated in the forward part of this bore (namely the part formed in the main body of the bar) while the rear part 111a of the bore 111 (formed in the bridge piece 110) constitutes a die into which the punch enters after penetrating the paper tape.

Figure 12:
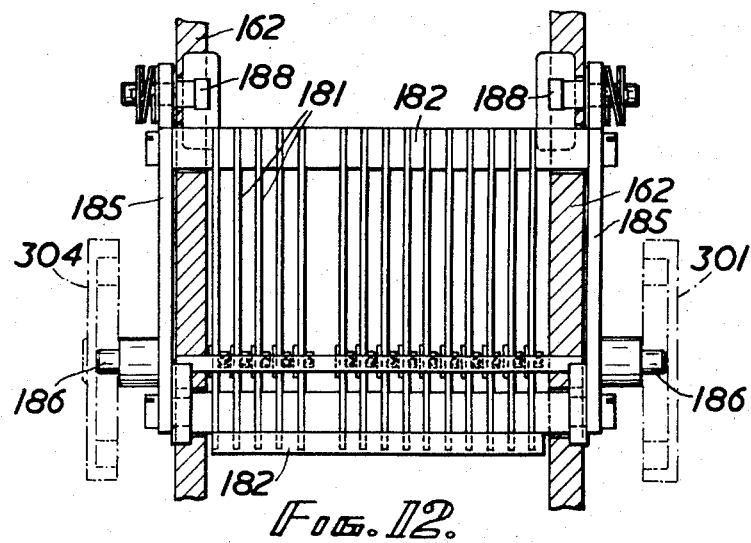
Figure 12 is a fractional front elevation (partly in section), showing the mechanism for operating the paper punches.
Figure 13:
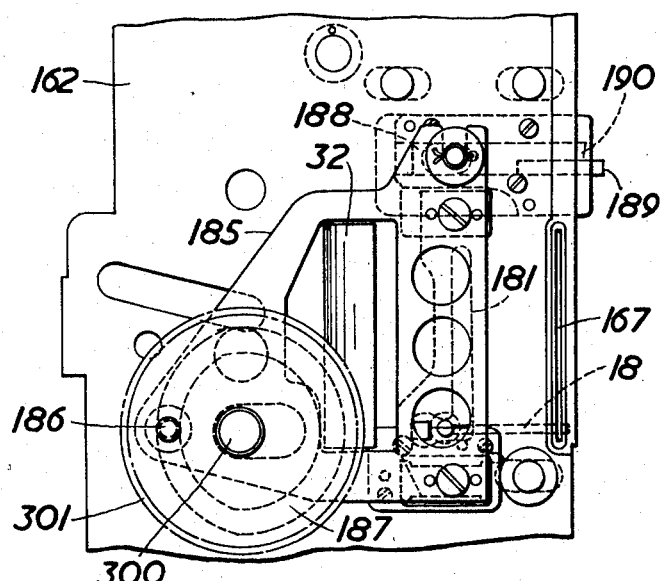
Figure 13 is a side elevation of the mechanism shown in Figure 12.
Figure 14:
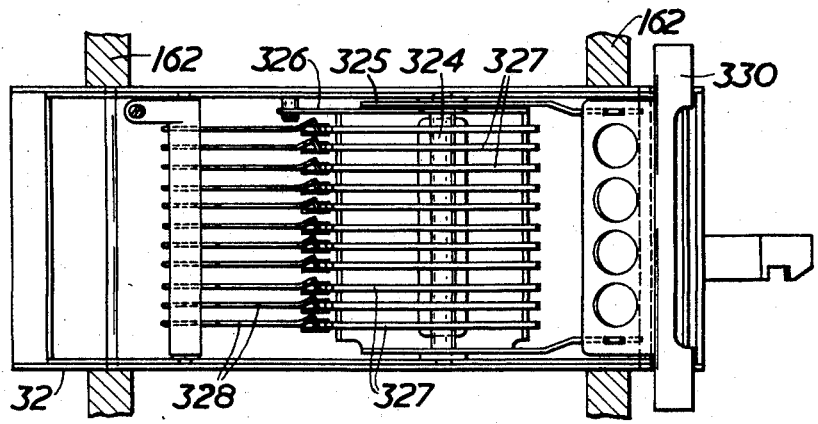
Figure 14 is a rear elevation of the mechanism provided for testing for faults in the paper tape, and for the continuity thereof.
Figure 15:
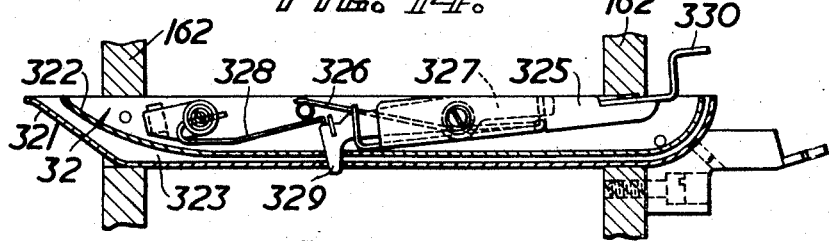
Figure 15 is a horizontal section through the mechanism shown in Figure 14.
Figure 16:
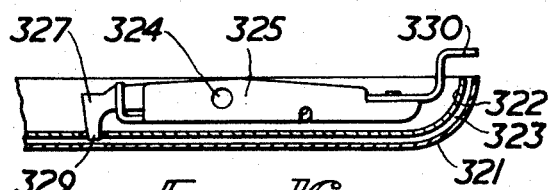
Figures 16 and 17 are fractional views corresponding to Figure 15 showing the mechanism in two alternative conditions.
Figure 17:
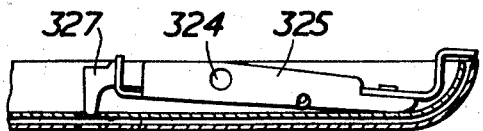

Each of the punches 18 projects forwardly from its type bar into a punch operating frame, whose construction is best seen from Figures 12 and 13. This frame comprises a set of vertical plates 181 secured together in spaced parallel relationship by bars 182 which project through slots in the chassis plates 162 of the stationary frame, so that the punch operating frame can move forwardly and rearwardly. Each of the plates 181 of the punch operating frame is formed with a vertical slot 183 which receives and guides a cross-pin 180 carried on the forward end of the punch 18. Each of the vertical slots 183 has a forward extension 184 at its lower end, so that when a type bar is in its lowermost position (in which the type element representing zero is level with the hammer bar) its punch will not be moved rearwardly to perforate the paper tape by rearward movement of the operating frame. The punches of type bars adjusted to any other position partake of the movements of the frame. The longitudinal tie bars 182 of the operating frame are connected together at their ends, outside the chassis plates 162 of the stationary frame, by a pair of members 185, each of which carries an outwardly projecting pin 186. The pins 186 engage in cam grooves 187 formed in the inner faces of the gears 301 and 304 which are fast to shaft 300. Rotation of shaft 300 thus drives back the operating frame to the position shown in Figure 13 and the punches of all type bars which are not in the zero position, thereby punching the required holes in the tape, and subsequently returns frame and punches to their normal forward position.

The plates 185 of the punch operating frame are each connected by a spring mounted bolt passing through a slot in the adjacent chassis plate 162 to a member 188 slidably disposed in a groove formed on the inner face of plate 162. Members 188 each comprise a part 189 which normally lies directly below the meter card slot 28 in the outer casing, the edges 271 of an inserted card (see Figure 20) resting on the parts 189, which support the card in the correct position for printing. Members 188 also carry punches 190 which (upon the punch operating frame being forced rearwardly in the position shown in Figure 13) sever the portions 272 of the card, so that when next inserted in the apparatus it will occupy a sufficiently lower position for the printing to be effected immediately above that effected at the previous operation.

The rearward movement of the punch operating frame also serves to effect accurate vertical positioning of the type bars before punching of the tape takes place. As best seen in Figures 7 and 8, the front edges of the type bars are formed with a number of recesses 112 spaced at vertical intervals equal to those of the type elements (namely, 3 mm.) and each plate 181 of the operating frame is formed with a rearwardly projecting tooth 191 having a bevelled tip, which engages in one or other of the recesses in the corresponding type bar when the operating frame moves rearwardly. The type bars are initially raised by insertion of the keys 19, 20 and operation of the levers 21 to 26 to slightly below the required positions and the bevelled upper edges of the teeth 191 on the operating frame complete the upward movements of the type bars. To permit these upward adjustments to take place, an appropriate clearance (not visible in the drawings) is provided between the rear end of each lever 103 and the recess 102 at the lower end of the type bar in which it engages, and between the teeth of each member 106 and the teeth 105 of the corresponding type bar.

Figure 18:
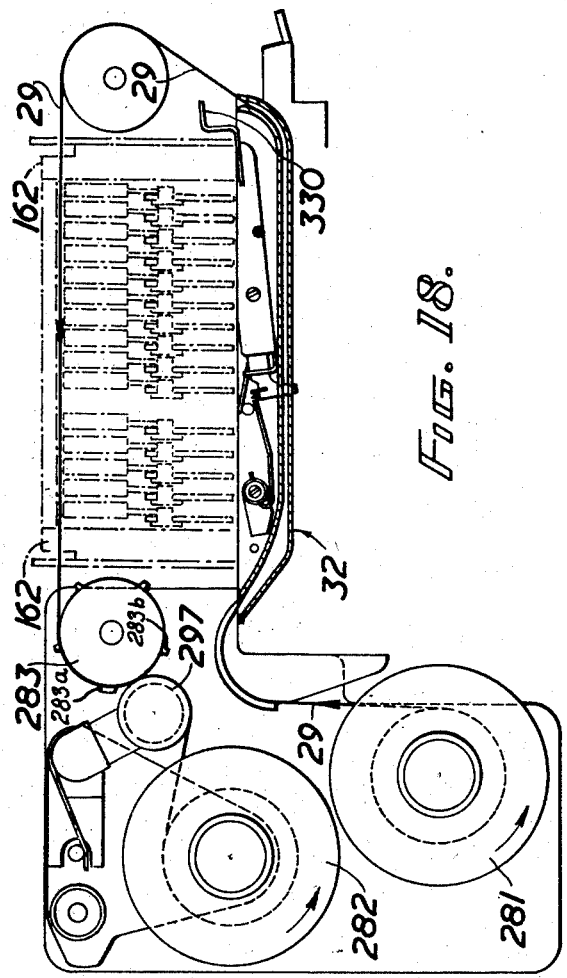
Figure 18 is a horizontal section taken on the line XVIII—XVIII of Figure 3, showing the path of travel of the paper tape.

The paper tape 29 is advanced through the apparatus by a sprocket drum 283 (Fig. 18), which is provided with teeth 283a, 283b and 283c (Figs. 3 and 18) engaging, respectively, perforations previously formed in the longitudinal margins of the tape (see Figure 19). Along one margin of the tape, all the perforations 291 are similar in shape (approximately square) and are spaced at equal distances apart, there being four perforations to each frame (i.e. the length of tape, indicated by the arrows 292 upon which one set of data is recorded). The perforations 291 of the tape 29 are engaged by the teeth 283c of the sprocket drum 283. Along the other margin of the tape there are five perforations to each frame, four of these 293 being similar to those in the first margin, while the fifth 294 is of elongated form. The perforations 293 and 294 of the tape 29 are engaged, respectively, by the teeth 283b and 283a of the sprocket drum 283. The leading end of the elongated perforation lies directly opposite the leading end of one of the perforations in the first margin and the transverse line on the tape thus defined constitutes a datum with reference to which the longitudinal positions of the holes 295 punched in each frame are determined. This asymmetrical arrangement of the marginal perforations in the tape ensures that the tape can only be inserted into the data recording apparatus (and later into the record card punching apparatus) in one way, since accidental reversal of the tape in any direction will result in lack of correspondence between the perforations and the correspondingly shaped and positioned teeth of the driving sprocket, as will any longitudinal displacement of the tape by a fraction of the length of a frame.

Figure 5:
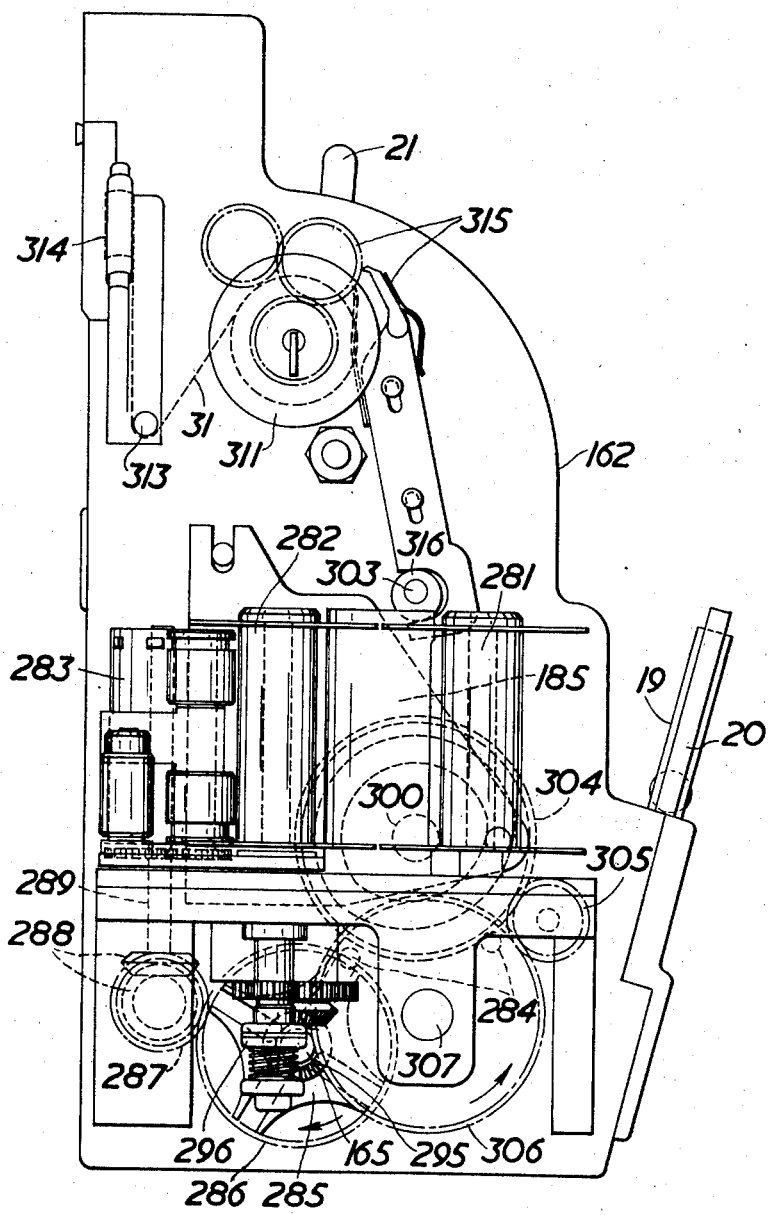
Figures 5 and 6 are end elevations of the interior mechanism, looking respectively in the directions of the arrows V and VI of Figure 4.

Sprocket 283 is driven from shaft 307 and makes one complete revolution, thus advancing the paper tape through one complete frame, while shaft 307 makes approximately half a revolution, sprocket 283 remaining stationary during the first half of the revolution of shaft 307. Gear wheel 306 on shaft 307 carries two pins 284 adapted to engage the slots of a Geneva wheel 285 fast on shaft 165. The motion of that shaft is transmitted through gears 286, 287 and bevel gear pair 288 to the shaft 289 of sprocket 283. Shaft 165, also carries a bevel wheel 295 which through the train of gears shown in Figure 5 and the friction clutch 296 drives the take-up reel 282 for the paper tape.

The storage reel 281 and take-up reel 282 for the paper tape are disposed one behind the other at one side of the apparatus, outside the chassis plates. The path of the tape is best seen from Figure 18. From the storage reel 281 the tape passes across in front of the type bars, to the opposite side of the apparatus, where it passes round a roller 296 and then back through the tunnel formed by slots 167 in the chassis plates and slots 109 in the type bars to the driving sprocket 283, with which it is held in engagement by the pair of spring mounted rollers 297, and thence to the take-up reel 282.

During its first passage across the front of the apparatus, the tape passes through a device, indicated generally by the reference 32, in which it is tested for continuity and for faults capable of causing incorrect operation of the card punching apparatus in which the tape is later to be used. The construction of the testing device 32 is illustrated in Figures 14 to 17. It comprises a pair of channel section members 321, 322 fitting one within the other and secured to the main chassis plates 162. The webs of members 321, 322 define between them a guide channel 323 for the paper tape. Between the flanges of the members 321, 322 there extends a rod 324, on which there is pivotally supported a flanged plate 325 which is urged by a light wire spring 326 into the position shown in Figure 17. Also pivotally supported on rod 324, for movement independently of plate 325 and of one another, are a number of feelers 327, each of which is urged by a spring 328 into the position shown in Figure 15, in which the tip 329 of the feeler projects through apertures in members 321, 322 across the channel 323 for the paper tape. During normal operation, the parts are held in the position shown in Figure 16, the tips of the feelers riding on the surface of the tape, but upon any feeler encountering a fault in the tape its spring 328 tilts that feeler and the plate 325 into the positions shown in Figure 15, against the action of the weaker spring 326.

Figure 6:
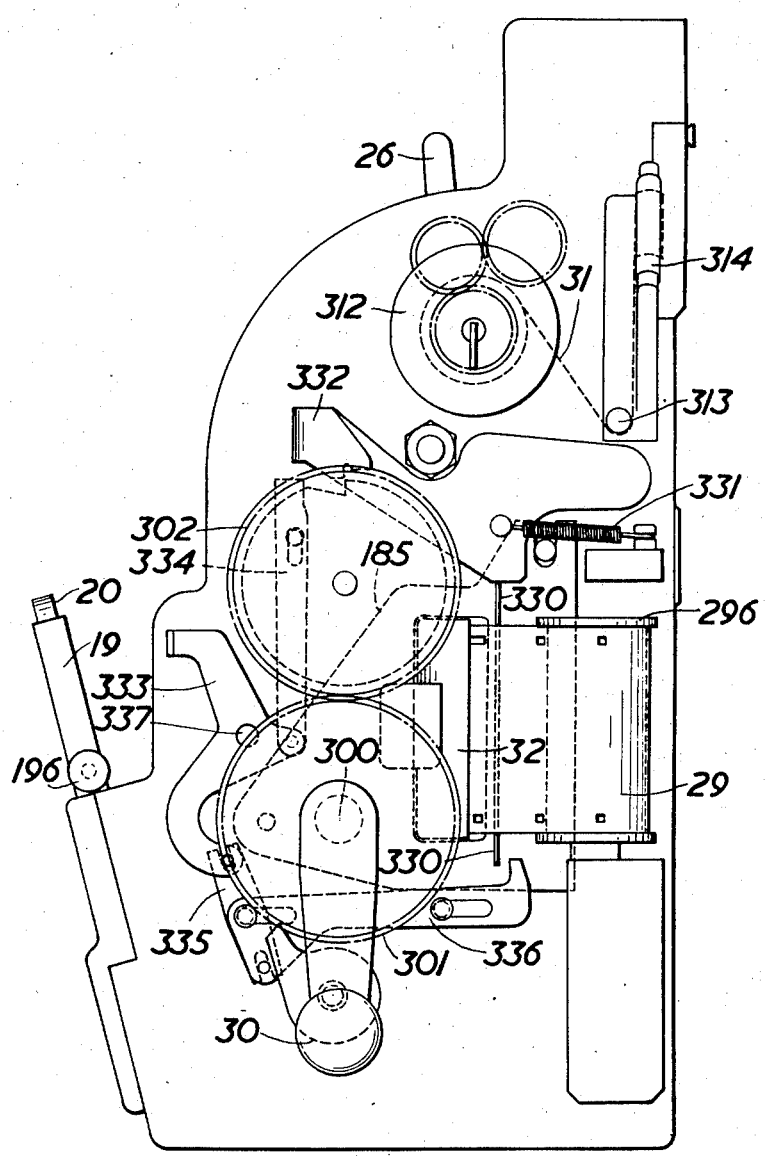

Secured to the plate 325 is a bar 330 which (as shown in Figure 6) is normally positioned to prevent the movement, under the action of a spring 331, of a detent 332. This detent 332 is adapted to engage and lock the shaft 303 when the latter has completed the revolution which was being made when the feeler encountered the fault. Thus, the occurrence of a fault in the length of paper which is being wound into position for punching at the next operation of the apparatus does not prevent the completion of the operation then in progress (which includes the punching of a previously tested length of paper), but does prevent any subsequent operation of the apparatus until the faulty length of paper has been extracted and a fresh length threaded.

To release the mechanism and allow correction of the fault, there is provided a hand unlocking lever 333 (Figure 6), which is fast on a shaft 337 journalled in the main chassis plates 162. When, after the occurrence of a fault, lever 333 is turned (counter-clockwise in Figure 6), it raises a link 334, which returns detent 332 against the action of its spring; it also rocks a lever 335, causing a link 336 to move forwardly and return bar 330 into position to support the detent. The movement imparted to bar 330 by such operation of lever 333 is sufficient to move plate 325 and feelers 328 into the position shown in Figure 17, in which the tips of the feelers are withdrawn completely from the guide channel 323, thereby facilitating removal and rethreading of the tape. Such operation of lever 333 also makes it possible to rotate crank handle 30 and thereby advance the tape, by releasing locking mechanism (described below) which normally prevents operation of the apparatus except when a meter key is inserted.

It will be appreciated that the test means described test not only for faults in the tape but also for the continuity of the tape and serve to lock the apparatus if the paper tape should be broken or exhausted and that the hand unlocking lever is employed when inserting a fresh tape.

The inked ribbon 31 through which the type elements print onto the meter record card, extends between a pair of reels 311, 312 disposed one on each side of the apparatus, outside the chassis plates 162. The ribbon reels are mounted with their axes horizontal and in line with one another, the ribbon passing from one reel to a horizontal guide rod 313, thence vertically upwards to an inclined guide rod 314, from which it passes horizontally between the type bars and the meter record card to a similar but oppositely inclined guide rod 314 and thence vertically downwards to a second horizontal guide rod 313 and so to the other reel. One reel is rotated through a small angle at each operation of the apparatus through a pawl and ratchet wheel mechanism 315 operated by a cam 316 on the shaft 303. Reversing mechanism allows either reel to be driven, so that the ribbon can be transferred back and forth between the two reels. The type elements strike over only one half the width of the ribbon, so that when the latter becomes worn, it can be reversed top to bottom to present a fresh surface to the type elements.

The meter keys 20 employed in conjunction with the apparatus are all cut from similar metal blanks whose form is shown by the broken line 201 in Figure 21. The lower end of each blank is cut away stepwise, as illustrated in the figure, in accordance with the number assigned to that particular key. The key illustrated is adapted to cause printing of the number 66715. The key is formed with an unlocking step 205 and with a small locking hole 202, whose functions are described below, and with a larger hole 203, by which it can be suspended. A projection 204 at the upper end of the key is adapted to engage over the upper end of the date key 19, when both keys are in position in the apparatus.

The date key 19 (Figure 22) comprises a casing 191, open at its lower end, within which four bars 192 to 195 are disposed side by side. These bars are formed with transverse holes which are in alignment when the bars are correctly positioned and a removable pin 196, passing through the aligned holes in the bars and screw-threaded into the casing 191 enables the bars to be released for adjustment or secured in position. The casing 191 is formed with apertures which expose index numbers marked on the bars, the numbers visible through these apertures indicating the date which the key is set to record.

An interlock mechanism best shown in Figures 9 to 11, ensures that (unless hand unlocking lever 333 is operated the apparatus will not be operated except when a meter key is correctly inserted. This mechanism is accommodated in the space left between the parts associated with type bars 5 and 6. At this position, shaft 300 carries a locking cam 210 (shown separately in Figure 11c) formed with a step 211. When no meter key is in position, rotation of shaft 300 is prevented by the engagement with step 211 of a latch 212 carried on a lever 213, which is pivotally supported on shaft 307 and is urged into operative position by a spring 214. Upon insertion of a meter key 20, its unlocking step 205 engages a lever 215, also supported on shaft 307, and rocks it against the action of a spring 216, causing a pawl 217 carried by lever 215 to withdraw latch 212 clear of the locking cam 211. Shaft 300 can now be rotated. Also secured to this shaft is a cam disc 218 (shown separately in Figure 11b) whose cam groove 219 receives a pin 220 projecting laterally from a bolt 221. The forward end of bolt 221 is slidably engaged in a bore formed in casing part 161 and extending across the path of meter key 20. The rear end of bolt 221 is forked and engages round shaft 300, by which it is guided. The initial rotation of shaft 300 and cam 218 moves bolt 221 forwardly, causing it to pass through the aperture 202 in the meter key, thereby retaining the latter in the fully inserted position throughout that part of the rotation during which recording takes place. The engagement of projection 204 on the meter key with the upper end of the date key ensures that the latter also is retained correctly inserted.

When bolt 221 moves forwardly, an inclined surface 222 on that bolt engages the end of pawl 217 and rotates the latter to release latch 212, which returns into engagement with the surface of cam 210. Upon completion of the revolution of shaft 300, latch 212 engages step 211 of cam 210 and arrests the shaft. During the last part of the revolution cam 218 withdraws bolt 221, allowing spring 216 to rotate lever 215 to cause partial ejection of key 20 (springs 104 and levers 105 assisting in such ejection) and to cause pawl 217 to ride over latch 212, ready for the next revolution of the driving handle.

Latch 212 is also withdrawn clear of the locking cam 211 to permit rotation of shaft 300, when shaft 337 is rotated (clockwise in Figure 9) by operation of the hand unlocking lever 333. To this end, a crank arm 223 fast on shaft 337 is connected to the upper end of a link 224, whose lower end is adapted to engage and depress latch 212 and lever 213 when lever 333 is operated.

The operation of the apparatus is briefly as follows, assuming that the paper tape 29 is in position in the apparatus and that the date key 19 has been adjusted and inserted. The setting arms 21 to 26 are moved by hand to the required positions, a meter card 27 is inserted in slot 28 to the extent permitted by the shoulders 271 on the card, and a meter key 20 is inserted. The meter key 20 is pressed fully down so that it rocks lever 215 against the action of spring 216, causing the withdrawal of latch 212 clear of the locking cam 210 and leaving shaft 300 free to rotate. Crank 30 is now turned by hand through one complete revolution, shafts 300, 303 and 307 consequently making one complete revolution. During the first part of the revolution of shaft 300, cam 218 moves bolt 221 into the aperture 202 of the meter key 20 and retains that key in the fully inserted position during the remainder of the revolution. The engagement of shoulder 204 on the meter key with the date key 19, holds the latter key also in the fully inserted position.

Rotation of shaft 303 causes the cams 177 on that shaft to turn the hammer levers 172 against the action of their springs 174, moving the hammers 173 forwardly. At the same time, the cam grooves 187 on the gears 301 and 304, fast to shaft 300, act upon the pins 186 of the punch operating frame and drive that frame rearwardly. Each of the teeth 191 on the frame engages in one of the recesses 112 in the corresponding type bar, raising the type bar slightly into the required position and retaining it in that position during the subsequent punching and printing operations. (It will be recalled that the type bars are raised to slightly below the required positons by the operation of the meter and date keys and of the setting arms 21 to 26.) Continued rearward movement of the punch operating frame causes the punches 18 of all those type bars which are not in the "zero" position, to penetrate the paper tape 29. Continued rotation of shaft 303 withdraws the punch operating frame forwardly to its former position.

While the teeth 191 of the punch operating frame are engaged with the type bars and are holding the latter accurately in position, the steps 177 of the cams 176 reach the projections 175 of the hammer levers 172 and permit the latter to turn under the influence of their springs 174. Each of the hammers 173 delivers a blow upon the front end of one of the type elements 17 of the corresponding type bar, throwing that type element forward to make an imprint upon the meter card. The hammer levers 172 are arrested by the stop bar 308 before the type elements strike the card, so that immediately after making the imprint, the type elements are free to return forwardly under the influence of their springs 171.

The above movements occur during the first half of the revolution of crank 30. During the second half of the revolution, the continued rotation of shaft 307 causes sprocket 283 to make one complete revolution. The paper tape 29 is consequently caused to advance through the length of one frame from the storage spool 281 to the take-up spool 282, bringing a fresh length of tape into position for punching. During such movement, the tape is tested for continuity and faults by the device 32. If a fault is encountered, the detent 332 is released and will lock shaft 303 against further rotation, when (but not before) the revolution of that shaft has been completed.

During the last part of the revolution of shaft 300, cam 218 withdraws bolt 221 from the aperture in the meter key 20. Spring 216 turns lever 215 about its pivot, to cause partial ejection of the meter key. Upon completion of the revolution, latch 212 engages the step 211 of cam 210 and arrests shaft 300, thereby preventing further rotation of the crank 30.

What is claimed is:

1. Apparatus for recording data comprising means for effecting the step by step feed of a paper tape in a direction longitudinal of the tape, a plurality of members disposed side by side and each differentially adjustable across the width of the tape to a plurality of positions, a paper punch carried by each of said members, a set of type elements operatively associated with each of said members so that adjustment of the member to any one of said positions is effective to locate a particular one of said elements in a printing position, and operating means effective after adjustment of said members to cause the punches to perforate the paper tape at positions dependent upon the adjustment of said members and to effect printing from that type element of each set which has been brought to the printing position by the adjustment of the members.

2. Apparatus in accordance with claim 1 in which each of said adjustable comprises two parts disposed adjacent the two opposite faces of the paper tape, these two parts being formed with aligned bores extending perpendicular to the plane of the tape, the paper punch being slidably disposed in one of these bores, while the other constitutes a die for cooperation with the punch.

3. Apparatus in accordance with claim 2 in which the part formed with the bore constituting the die is of elongated form and is secured at each end to a face of the part in which the punch is slidably disposed, the two parts being spaced from one another intermediate the ends of the first part to constitute a narrow slot through which the paper tape passes.

4. Apparatus in accordance with claim 1, in which some at least of said adjustable members are provided with mutually separate manually operable setting means.

5. Apparatus in accordance with claim 4 wherein said setting means comprise a rotatably mounted member having gear teeth meshing with rack teeth on said adjustable member, and index markings cooperating with said rotatable member to indicate the position in which said adjustable member is located.

6. Apparatus in accordance with claim 1, in which some at least of said adjustable members are arranged for simultaneous differential adjustment by common setting means.

7. Apparatus according to claim 6, comprising a bodily separable key member for locating a group of the adjustable members to positions determined by the design of said key member.

8. Apparatus as claimed in claim 7, comprising means for preventing operation of the apparatus to effect printing and punching in the absence of a key in position in the apparatus and to retain the key member until its operation is completed.

9. Apparatus as claimed in claim 7, comprising means for causing at least partial ejection from the apparatus of the bodily separable key member upon completion of its operation.

10. Apparatus as claimed in claim 1, comprising a punch operating member movable toward and away from the paper tape, all of the punches being coupled to said member for movement therewith, except when they are in one particular position of adjustment.

11. Apparatus as claimed in claim 1, comprising a movable punch operating member which carries locating means adapted to engage with any one of a series of cooperating locating means spaced longitudinally apart upon each of said adjustable members, the punch operating member causing, by its movement, the punches to perforate the tape and to effect exact location of each of the adjustable members in one of its said positions.

12. Apparatus as claimed in claim 1, comprising a member movable towards and away from the tape, for operating during the former movement the punches to perforate the paper tape and for operating also a further punch to remove a part of the sheet upon which printing is effected.

13. Apparatus in accordance with claim 1, and including means for testing the continuity of the paper tape fed to the position in which it is perforated by the punches and effective to prevent further operation of the apparatus upon the occurrence of a discontinuity in the tape.

14. Apparatus in accordance with claim 13, in which the tape testing means are effective to prevent further operation of the apparatus only after the completion of the cycle of operations in which the discontinuity occurred.

15. Apparatus in accordance with claim 1 in which the means for effecting feed of the paper tape include a drive sprocket having teeth adapted to engage perforations provided in the tape adjacent its edges, the teeth being differentially dimensioned and spaced so that a tape formed with corresponding perforations will register with the sprocket teeth only in predetermined positions thereof.

16. For use with apparatus for recording data, a paper tape formed adjacent its edges with perforations adapted for engagement by the similarly dimensioned and spaced teeth of a drive sprocket, the perforations being so dimensioned and spaced that they will not register with the teeth of such a sprocket if the paper tape is reversed in position about any axis.

17. Apparatus for recording data, comprising a plurality of elongated members disposed in side by side parallel relationship, a single paper punch carried on each of said elongated members and movable transversely thereof, means for effecting differential longitudinal adjustment of said elongated members, a set of type elements operatively associated with each of said elongated members so that adjustment of the member to a given position is effective to locate a particular one of said type elements in a printing position, means for guiding a paper tape along a path extending transversely of said elongated members and of the directions of movement of said punches, and operating means effective to move the punches relative to the respective elongated members and cause them to penetrate the paper tape at positions across the width of the latter dependent upon the positions of adjustment of said members and also effective to cause printing from that type element of each set which has been brought to the printing position by the adjustment of said elongated members, the elongated members each carrying both the type element and the single punch being arranged to print on a sheet insertible in the apparatus.

18. Apparatus for recording data comprising a plurality of elongated members disposed in side by side parallel relationship, each formed with a narrow elongated slot penetrating the member from side to side thereof and extending longitudinally of the member, all of said slots being in alignment with one another, and each formed with a single bore extending transversely of said member and intersecting the slot therein, all of said bores lying parallel to one another, a punch slidably disposed in each of said bores and moveable to lie clear of said slot or to extend across it, means for effecting differential longitudinal adjustment of said elongated members, a set of type elements operatively associated with each of said elongated members so that adjustment of the member to a given position is effective to locate a particular one of said type elements in a printing position, means for guiding a paper tape having a width less than the length of said elongated slots through the aligned slots in all of said elongated members, and operating means effective to move the punches relative to the respective elongated members and cause them to penetrate the paper tape at positions across the width of the latter dependent upon the positions of adjustment of said members and also effective to cause printing from that type element of each set which has been brought to the printing position by the adjustment of said elongated members, the elongated members each carrying both the type element and the single punch being arranged to print on a sheet insertible in the apparatus.

19. Apparatus for recording data comprising a plurality of elongated members disposed in side by side parallel relationship, each formed with an elongated aperture extending longitudinally of the member and with a bore extending transversely of the member and intersecting said aperture, a paper punch disposed in each of said bores, punch operating means for simultaneously moving all of said punches longitudinally of their respective bores, a plurality of type elements carried by each of said elongated members and spaced apart longitudinally of the member, each type element being mounted for independent transverse movement relative to the elongated member by which it is carried, printing means for simultaneously operating one type element of each elongated member, a paper tape storage reel, a paper tape take up reel, means for guiding a paper tape along a path from said storage reel through all of said elongated apertures to said take up reel, tape advancing means for effecting longitudinal movement of said tape along said path, means for effecting differential longitudinal adjustment of said elongated members relative to said printing means and said paper tape guiding means, whereby to adjust each of said punches across the width of said tape path and position one type element of each elongated member for operation by said printing means, and manually driven actuating means for operating said punch operating means, said printing means and said tape advancing means, the elongated members each carrying both the type element and the single punch being arranged to print on a sheet insertible in the apparatus.

20. Apparatus for recording data comprising means for effecting the step by step feed of a paper tape in a direction longitudinal of the tape, a plurality of adjustable members disposed side by side and differentially moveable across the width of the tape, a paper punch carried by each of said members, actuating means manually rotatable from and back to a starting position and effective during such rotation to operate the punches to perforate the paper tape at positions dependent upon the setting of said adjustable members and to operate the tape feeding means, a latch normally preventing said actuating means from leaving said starting position, a key bodily separable from the remainder of said apparatus and effective on engagement with the apparatus to cause movement of a group of said adjustable members to positions determined by the form of the key and to withdraw said latch whereby to permit movement of said actuating means, a detent operable to engage said key and prevent its disengagement from the apparatus and means responsive to movement of said actuating means from its starting position for operating said detent to retain said key until said actuating means has been returned to its starting position.

21. Apparatus for recording data comprising means for effecting the step by step feed of a paper tape in a direction longitudinal of the tape, a plurality of adjustable members disposed side by side and differentially moveable across the width of the tape, a paper punch carried by each of said members, actuating means manually rotatable from and back to a starting position and effective during such rotation to operate the punches to perforate the paper tape at positions dependent upon the setting of said adjustable members and to operate the tape feeding means, a detent moveable to engage said actuating means only when the latter is in its starting position and adapted on engagement to hold the actuating means in that position, a plurality of feelers spaced apart across the width of the paper tape, means biasing each of said feelers against the tape and causing displacement of the feeler upon removal of the restraint offered by the tape, and means operating in response to movement of any one of said feelers to urge said detent into engagement with said actuating means.

22. Apparatus for recording data comprising a paper tape storage reel, a paper tape take-up reel, means for guiding a paper tape along a path from said storage reel to said take-up reel, a plurality of adjustable members disposed side by side and differentially moveable across the width of said tape path, a paper punch carried by each of said members, actuating means for operating said punches to perforate the tape, and a drive sprocket for engaging the tape and advancing it along said path, said sprocket including two sets of radially projecting teeth spaced apart axially of said sprocket, the teeth of one of said sets being unsymmetrical about every diameter of said sprocket and the teeth of the other set being differentially dimensioned and spaced relative to those of the first set.

23. For use with apparatus for recording data a paper tape formed adjacent one longitudinal edge with a first set of perforations spaced longitudinally apart and unsymmetrical in dimensions and spacing about every line extending in the plane of the tape transversely thereof, and formed adjacent its other longitudinal edge with a second set of perforations spaced longitudinally apart and differentially spaced and dimensioned from said first set, the perforations of both said first and said second set being repeated at regularly spaced and equal intervals along the whole length of the tape.

References Cited in the file of this patent

UNITED STATES PATENTS

| | | |
|---|---|---|
| 1,091,498 | Friedlein | Mar. 31, 1914 |
| 1,219,766 | Pierce | Mar. 20, 1917 |
| 1,862,032 | Pierce | June 7, 1932 |
| 1,875,117 | O'Connor | Aug. 30, 1932 |
| 1,905,659 | Thomson | Apr. 25, 1933 |
| 1,909,548 | Pierce | May 16, 1933 |
| 1,963,205 | Lawrence | June 19, 1934 |
| 2,002,437 | Maul | May 21, 1935 |
| 2,050,745 | Woodruff | Aug. 11, 1936 |
| 2,054,451 | Skinner | Sept. 15, 1936 |
| 2,114,294 | Green | Apr. 19, 1938 |
| 2,172,812 | Van Weenen | Sept. 12, 1939 |
| 2,278,118 | Pitman | Mar. 31, 1942 |
| 2,521,372 | Houston | Sept. 5, 1950 |